(12) United States Patent
Bosche et al.

(10) Patent No.: US 7,386,926 B2
(45) Date of Patent: Jun. 17, 2008

(54) STRUT SPRING COMPRESSOR AND METHOD

(75) Inventors: Kevin S. Bosche, Moorhead, MN (US); Thomas S. Bolgrean, Fargo, ND (US)

(73) Assignee: Branick Industries, Inc., Fargo, ND (US)

(*) Notice: Subject to any disclaimer, the term of this patent is extended or adjusted under 35 U.S.C. 154(b) by 0 days.

(21) Appl. No.: 11/387,990

(22) Filed: Mar. 23, 2006

(65) Prior Publication Data

US 2007/0220728 A1   Sep. 27, 2007

(51) Int. Cl.
*B23P 19/04* (2006.01)

(52) U.S. Cl. .......................... 29/227; 29/225; 254/10.5

(58) Field of Classification Search .................. 29/227, 29/216, 217, 218, 225, 228; 254/10.5
See application file for complete search history.

(56) References Cited

U.S. PATENT DOCUMENTS

| | | | |
|---|---|---|---|
| 1,036,441 A | 8/1912 | Buck | |
| 2,646,618 A | 7/1953 | Simons | |
| 2,971,565 A | 2/1961 | Jarund | |
| 3,067,500 A | 12/1962 | Bliss | |
| 3,384,348 A | 5/1968 | Wicker | |
| 3,814,382 A | 6/1974 | Castoe | |
| 3,912,224 A | 10/1975 | Castoe | |
| 4,009,867 A * | 3/1977 | Diffenderfer | ............... 254/10.5 |
| 4,034,960 A | 7/1977 | Kloster | |
| 4,036,473 A | 7/1977 | Kloster | |
| 4,105,188 A | 8/1978 | Mendoza et al. | |
| 4,219,918 A | 9/1980 | Klann | |
| 4,295,634 A | 10/1981 | Spainhour et al. | |
| 4,395,020 A | 7/1983 | Spainhour | |
| 4,486,935 A | 12/1984 | Kashiwagi | |
| 4,494,289 A | 1/1985 | Matsuura | |
| 4,502,664 A | 3/1985 | Bendickson et al. | |

(Continued)

FOREIGN PATENT DOCUMENTS

DE                 1089306              9/1960

OTHER PUBLICATIONS

Tech Bulletin TB-59, Branick Industries, Mar. 15, 1990.

(Continued)

*Primary Examiner*—Lee D Wilson
(74) *Attorney, Agent, or Firm*—Merchant & Gould P.C.

(57) ABSTRACT

An apparatus and method for use in assembling and disassembling a strut assembly having a shock absorber axially disposed within a coil spring includes a frame, a first section secured to the frame to support one portion of the strut assembly, a second section including a compression head secured to and axially adjustable relative to the frame, the second section including a compression element arrangement to impart a force on a second portion of the strut assembly and urge the spring to compress as the compression head is axially moved toward the first section, and urging structure to move the second section toward and away from the first section. The compression element arrangement includes at least three holders, each of the at least three holders is independently axially adjustable relative to the frame. The compression head includes a spider member having a hub with arms, the hub being secured to the urging structure, and each of the arms being secured to the compression element arrangement.

6 Claims, 6 Drawing Sheets

U.S. PATENT DOCUMENTS

| | | | |
|---|---|---|---|
| 4,516,303 A | | 5/1985 | Kloster |
| 4,520,543 A | | 6/1985 | Ito |
| 4,555,100 A | | 11/1985 | Ditto |
| 4,558,500 A | | 12/1985 | Kloster |
| 4,785,519 A | | 11/1988 | Krueger |
| 4,834,352 A | | 5/1989 | Thorton |
| 4,872,644 A | | 10/1989 | Papapetros |
| 4,872,645 A | | 10/1989 | Dossier |
| 5,031,294 A | | 7/1991 | Krueger |
| 5,172,889 A | * | 12/1992 | Post et al. .................. 254/10.5 |
| 5,477,598 A | * | 12/1995 | Borner, Jr. .................... 29/227 |
| 5,680,686 A | * | 10/1997 | Bosche et al. ................ 29/227 |
| 5,954,314 A | * | 9/1999 | Weisshaar ................. 254/10.5 |
| 6,129,339 A | * | 10/2000 | Lundgreen et al. ........ 254/10.5 |
| 6,336,625 B1 | * | 1/2002 | Liao ............................ 267/66 |
| RE38,818 E | * | 10/2005 | Amstutz .................... 254/10.5 |

OTHER PUBLICATIONS

Branick Brochure on MST-580A, dated before Jan. 17, 1996.
Branick Brochure entitled "The Branick MST-580A MacPherson Strut Spring Compressor . . . Designed with the Mechanic in Mind," dated before Jan. 17, 1996.
Branick "Product Update," dated before Jan. 17, 1996.
Operating Instructions entitled, "MacPherson—Strut Spring Compressor," dated before Jan. 17, 1996.
Operating Instructions entitled, "Air Operated MacPherson Strut Spring Compressor," dated before Jan. 17, 1996.
Operating Instructions entitled, "Stock #5800-1 1989 or Later Ford Thunderbird & Mecury Cougar Adapter," dated before Jan. 17, 1996.
Operating Instructions entitled, "Compressor para Resortes de Suspensiones MacPherson," dated Sep. 1992.
Operating Instructions entitled, "Model 610, Model 612 MacBridge, MacPherson Strut Spring Compressor Tools," dated before Jan. 17, 1996.
Brochure entitled, 447 P Spring Compressor, dated before Jan. 17, 1996.
Brochure entitled, "Coil Spring Compressor," dated before Jan. 17, 1996.
Brochure entitled, "Coil Spring Compressor, for MacPherson Suspensions, Save Time-Money, Work Efficiently," dated before Jan. 17, 1996.
Brochure entitled "Quality Strut Tools," dated before Jan. 17, 1996.
Advertisements entitled, "GP Grand Performance Tool," 1981.
Operating Instructions entitled, "Mitsubishi MacPherson Strut Spring Compressor," Jun. 1, 1990.
Operating Instructions entitled, "Clamshell Strut Tool," Jun. 1, 1993.
Brochure entitled, "Chassis Clinic Tool Offer," Jan. 1993.
Brochure entitled, "Kowa Seiki Universal Strut Compressor," dated before Jan. 17, 1996.
Brochure entitled, "Mod. 89 SAS Brevettato," dated before Jan. 17, 1996.
Advertisement entitled, "Under Car Tool-Up Time," Dec. 1990.

* cited by examiner

STRUT SPRING COMPRESSOR AND METHOD

TECHNICAL FIELD

This disclosure relates generally to accessory tools. More particularly, this disclosure relates to an apparatus for use in assembling and disassembling a strut assembly having a shock absorber axially disposed within a coil spring and methods of use.

BACKGROUND

Certain types of automotive suspension systems, such as the MacPherson-type, include a suspension subassembly. The subassembly includes a shock absorber and a spring, and is often referred to as a strut assembly. The shock absorber or damper consists of a piston within the body of the shock absorber connected to a piston rod which projects upwardly from the shock absorber in a telescoping fashion. A coil spring is mounted in a compressed states around the piston rod and body of the shock absorber between a lower spring seat integral with the body of the absorber and an upper spring seat fastened to the upper end of the piston rod of the shock absorber. Such a suspension subassembly is mounted as a unit in the vehicle body and is disassembled, serviced, and reassembled separately.

Disassembly of the strut assembly is accomplished by compressing the coil spring using a suitable tool to remove pressure from the lower spring seat of the strut assembly. Having done so, the retaining means-holding the piston rod to the upper spring seat can be removed. This retaining means variously takes the form of a nut or retaining ring which fastens above the upper spring seat to the piston rod retaining all components of the strut assembly. The shock absorber and lower spring seat can then be removed leaving the spring in a compressed state within the tool. If required, the spring can then be decompressed and removed. In some cases, the coil spring must be compressed by engaging the spring between the upper and lower spring seats rather than engaging the upper spring seat and spring.

New or serviced components can be assembled following the reverse of the foregoing process. Namely, with the spring in a compressed state, the shock absorber is placed axially through the spring such that the piston rod protrudes beyond the coil spring upper end and the lower spring seat contacts the lower end of the compressed spring. The appropriate retaining means is fastened to the piston rod above the upper spring seat. The strut assembly is released from the tool and is ready for reinstallation in the vehicle.

Numerous apparatus have been developed to assist in the assembly and disassembly of a strut suspension system. Examples of these may be found in U.S. Pat. Nos. 4,558, 500; 4,520,543; 4,516,303; 4,494,289; 4,785,519; 5,031, 294; and 5,680,686 to name a few. With the design and development of newer and different types of strut assemblies, it has become desirable to have an apparatus which can accept a wide variety of different types of strut assemblies and different types and sizes of MacPherson strut assemblies. It is also desirable that the apparatus is able to be quickly adapted by the user to accept a particular sized strut assembly for quick and efficient assembling and disassembling. It is also recognized to be important to ensure that the apparatus can securely engage and retain a spring to be compressed and otherwise ensure safety to an operator since the springs are compressed under a large force which, if released without control, could injure an operator.

SUMMARY

In general, an apparatus for use in assembling and disassembling a strut assembly having a shock absorber axially disposed within a coil spring is provided. The apparatus is an improvement on previously existing apparatus. Previously existing apparatus includes generally a frame; a first section secured to the frame to support one portion of the strut assembly; a second section including a compression head secured to and axially adjustable relative to the frame; the second section including a compression element arrangement to impart a force on a second portion of the strut assembly and urge the spring to compress as the compression head is axially moved toward the first section; an urging structure to move the second section toward and away from the first section. In one aspect, the improvement includes the compression element arrangement having at least three holders, with each of the at least three holders being independently axially adjustable relative to the frame.

The apparatus includes a spider member having a hub and a plurality of arms. The hub is secured to the urging structure, and each of the arms is secured to the compression element arrangement.

The compression head includes at least three axial translators. Each axial translator is axially adjustable relative to the frame; secured to one of the arms of the plurality of arms; and secured to one of the holders of the at least three holders.

Preferably, each of the axial translators includes a frame sleeve slidable over the frame. In one preferred arrangement, the frame includes at least three posts, with each of the frame sleeves being slidably disposed around one of the three posts.

Preferably, each of the axial translators further includes a holder sleeve, with each of the holder sleeves retaining one of the three holders.

Preferably, the frame includes a top plate, a bottom plate, and at least three posts connecting the top plate and the bottom plate. The urging structure includes a threaded shaft extending through the top plate and a bearing with a handle; first and second hubs on opposite sides of the top plate; the second hub being mounted by way of a bearing to allow the first and second hubs to be turnable; the shaft extending through the first and second hubs and the bearing; and a handle secured to the first hub; the handle being rotatable relative to the shaft to axially move the shaft relative to the frame.

In another aspect, a method for disassembling a strut assembly having a shock absorber axially disposed within a coil spring is provided. The method includes orienting the strut assembly within an apparatus having a frame including supporting one portion of the strut assembly with a first section secured to the frame. Next, there is a step of orienting the strut assembly so that a second section including a compression head secured to the frame holds a second portion of the strut assembly, including independently axially adjusting three holders relative to the frame, with each of the three holders engaging the second portion of the strut assembly. Next, there is a step of urging the second section toward the first section to impart a compression force on the spring as the compression head is axially moved toward the first section.

It is to be understood that both the foregoing general description and the following detailed description are exemplary and explanatory only and are not restrictive of the invention, as claimed.

The accompanying drawings, which are incorporated in and constitute a part of this specification, illustrate embodiments and together with the description, serve to explain the principles of the invention. In the drawings:

DETAILED DESCRIPTION

Figure 1:
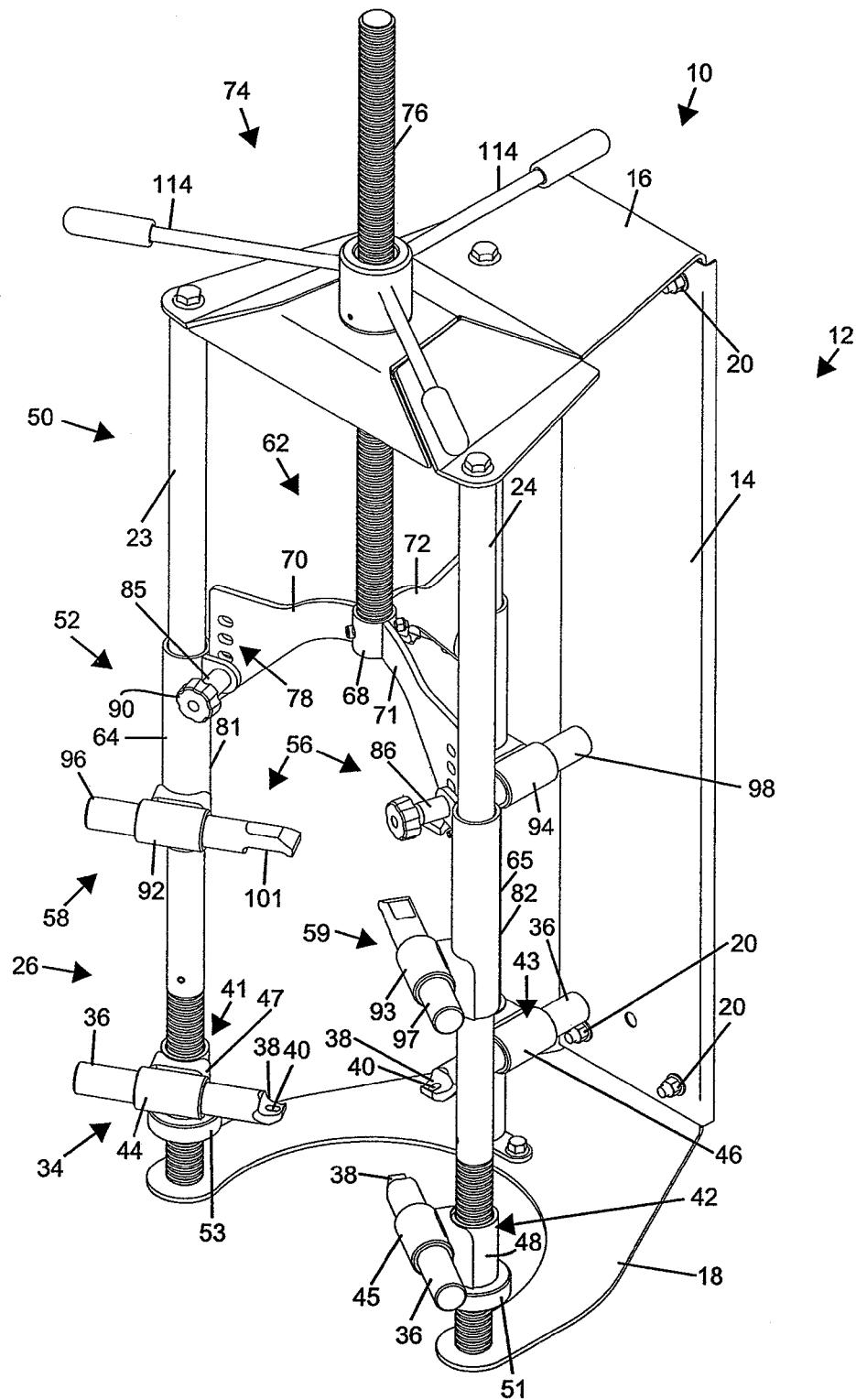
FIG. 1 is a perspective view of an apparatus constructed according to principles of this disclosure.
Figure 2:
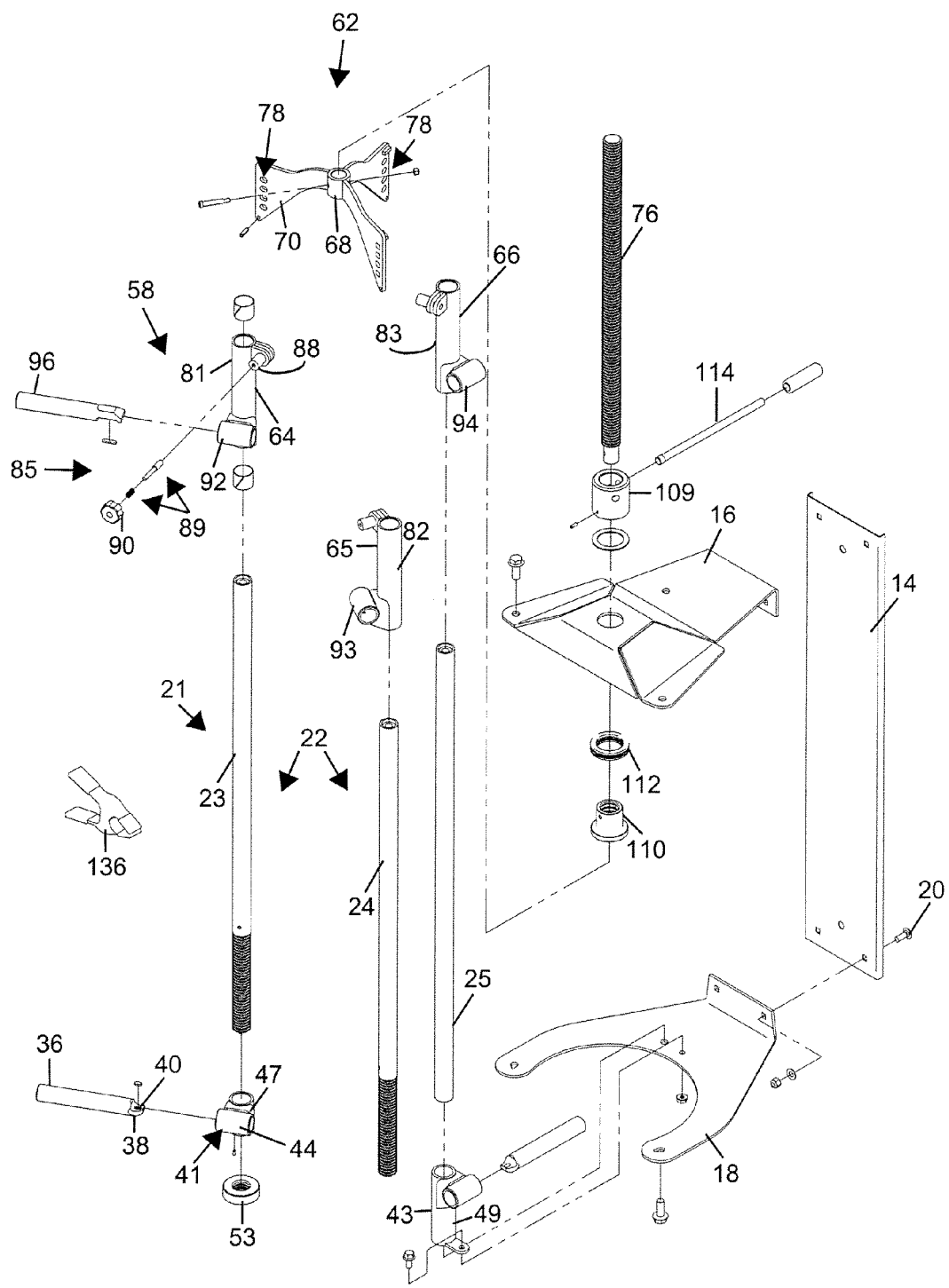
FIG. 2 is an exploded view of the apparatus depicted in FIG. 1.

An apparatus for use in assembling and disassembling a strut assembly 30 (FIG. 5) having a shock absorber 32 (FIG. 5) axially disposed within a coil spring 28 (FIG. 5) is shown in FIG. 1 generally at 10. The apparatus 10 includes a frame 12. The frame 12, in the embodiment shown, has a flat, vertically disposed back plate 14, which may be mounted against a wall (not shown), mounted to a bench (not shown), mounted to a cart for mobility, or is otherwise mounted with a stand. The frame 12 further includes a top plate 16 and a bottom plate 18. Each of the top plate 16 and bottom plate 18 is secured to the back plate 14, in the embodiment shown, by bolts 20. Extending between the top plate 16 and the bottom plate 18 is a plurality of support members 21 (FIG. 2), embodied as bars or posts 22 (FIG. 2). In general, there are at least three posts 23, 24, and 25 (FIGS. 1-5) spaced apart from each other and extending between the top plate 16 and bottom plate 18.

Figure 5:
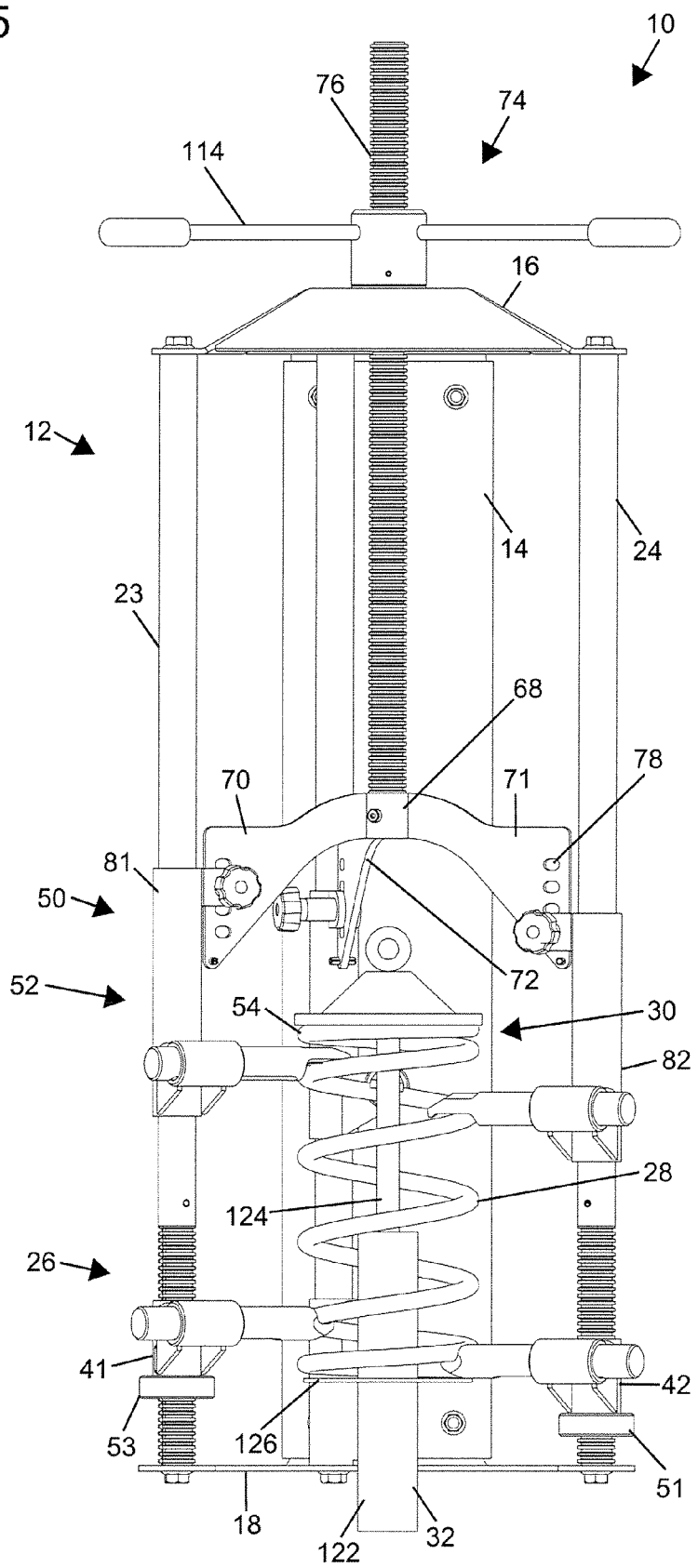
FIG. 5 is a front view similar to FIG. 3 and depicting the apparatus being used with one type of strut assembly.

The apparatus 10 includes a first compression section 26 for supporting one portion of spring 28 (FIG. 5) of strut assembly 30 (FIG. 5). More particularly, a preferred way of holding the lower portion of the spring 28 includes an arrangement of holders 34 (FIG. 1). The holders 34 engage a portion of the spring 28 to support and hold the strut assembly 30 while assembling or disassembling.

In the embodiment shown in FIG. 1, the holders 34 each include a rod 36 ending with a hook 38. In the embodiment shown, each of the rods 36 is generally cylindrical in shape, with each of the hooks including cupped recessed areas 40. These recessed areas 40 are for holding the coil of the spring 28. In preferred arrangements, the cupped recessed areas 40 have a cushioned, such as rubber, pad for holding the coil of the spring 28. Use of elements other than hooks, such as bars or plates, may also be used to engage the strut assembly 30.

The first compression section 26 includes an arrangement to allow the holders 34 to be adjusted radially and axially to accommodate a wide variety of springs. In particular, in the embodiment depicted in FIG. 1, mounts 41, 42, and 43 allows the holders 34 to be adjusted radially and axially relative to the frame 12. Each of the mounts 41, 42, and 43 includes a holder sleeve 44, 45, and 46 for supporting a respective one of the holders 34; each mount 41-43 also includes a frame sleeve 47, 48, 49 (described further below). Each of the holders 34 can be adjusted radially within its respective holder sleeve 44, 45, and 46. In addition, each of the holders 34 can be adjusted rotationally within its respective holder sleeve 44, 45, and 46. In other words, each of the holders 34 can be adjusted both radially with respect to the frame 12 (axially within its respective holder sleeve 44-46) and rotationally within its respective holder sleeve 44-46 in order to accommodate the geometry of the spring 28.

Figure 3:
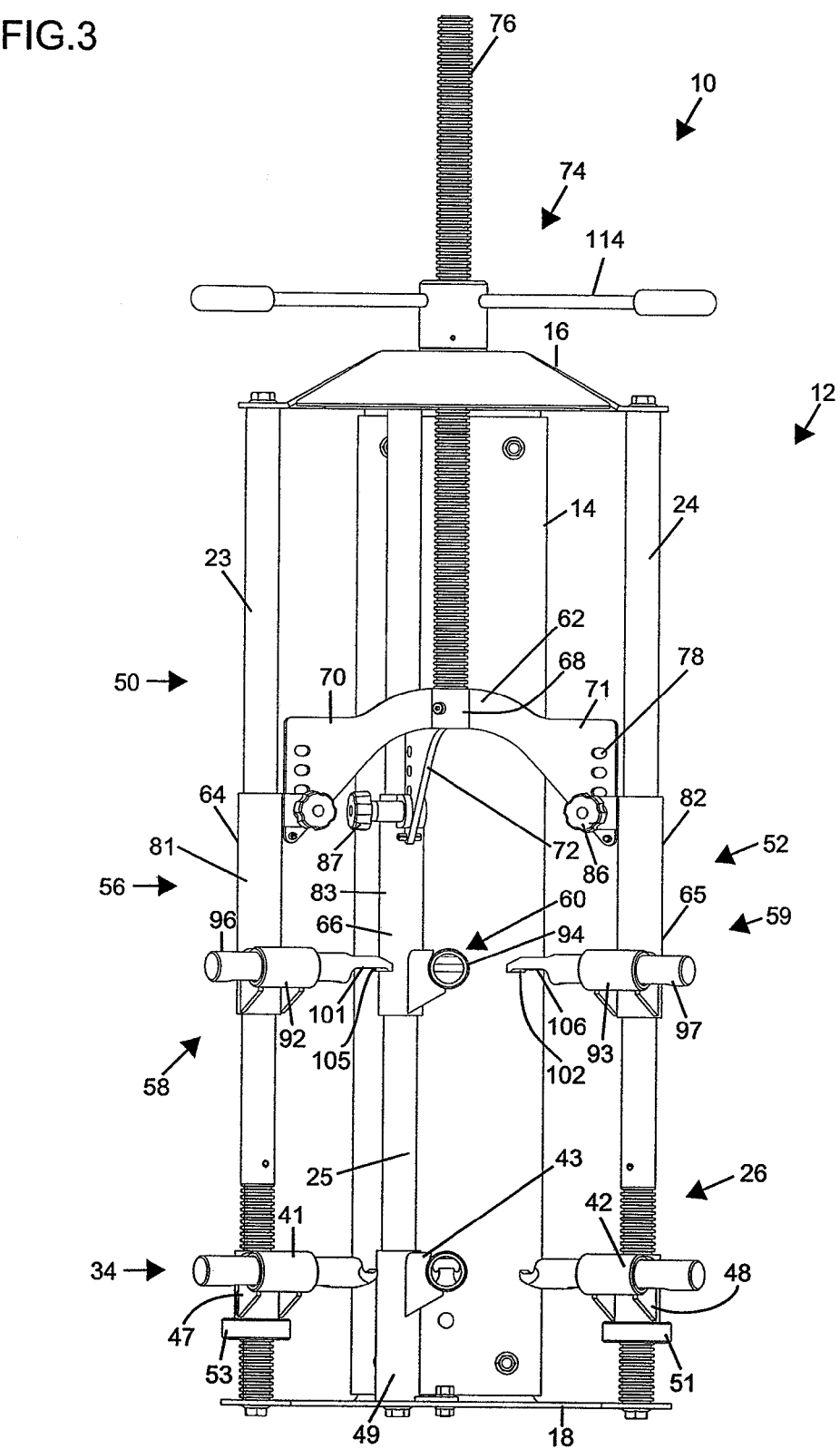
FIG. 3 is a front elevational view of the apparatus depicted in FIG. 1.

In addition, as mentioned above, each of the mounts 41-43 includes a frame sleeve 47, 48, and 49 (FIGS. 2-4) which is slidably mounted over the frame 12, specifically, a respective one of the posts 23, 24, and 25. At least the frame sleeves 47 and 48 are axially adjustable on the post 23 and post 24, respectively. In the embodiment shown, the holder 34 on the post 25 is not axially adjustable relative to the frame 12, although, in other embodiments, it could be axially adjustable. As can be seen in FIGS. 1 and 3, the mounts 41 and 42 are adjustable along the posts 23 and 24 by way of nuts 53, 51, which upon rotation, will move the mounts 41 and 42 axially (vertically) along respective posts 23, 24. Other adjustment arrangements can be used. It should be appreciated that the adjustability of the holders 34 in the first compression section 26 allows the apparatus 10 to accommodate a wide variety of strut assemblies.

In reference to FIG. 1, the apparatus 10 includes a second compression section 50 including a compression head 52 secured to and axially adjustable relative to the frame 12. The second compression section 50 is movable toward and away from the first compression section 26 and allows for axially compressing the spring 28 as the second compression section 50 moves towards the first compression section 26. The second compression section 50 holds an upper portion of the strut assembly 30 including, for example, the spring 28 or any other portion, such as the upper spring seat 54 (FIG. 5).

In the embodiment shown, the compression head 52 includes a compression element arrangement 56. The compression element arrangement 56 imparts a force on a portion of the strut assembly 30, for example, on the spring 28, and urges the spring 28 to compress as the compression head 52 is axially moved toward the first compression section 26. In accordance with principles of this disclosure, the compression element arrangement 56 includes at least three holders 58, 59, and 60 (FIG. 3). Each of the at least three holders 58-60 is independently axially adjustable relative to the frame 12 by way of axial translators 64, 65, 66 (described further below). In other words, through the use of the axial translators 64-66 (described below), each of the at least three holders 58-60 can be adjusted vertically relative to the frame 12 and independent of the axial or vertical adjustment of the other remaining holders. In the embodiment depicted, each of the holders 58-60 includes a rod 96, 97, and 98 having a hook 101, 102 (FIG. 3), and 103 (FIG. 4).

In reference to FIG. 3, in the particular embodiment illustrated, the compression head 52 includes a spider member 62 and at least three axial translators 64, 65, and 66. The spider member 62 and the axial translators 64-66 cooperate with the compression element arrangement 56 to result in a sturdy, durable compression head 52 useable with a variety of strut assemblies 30.

Figure 4:
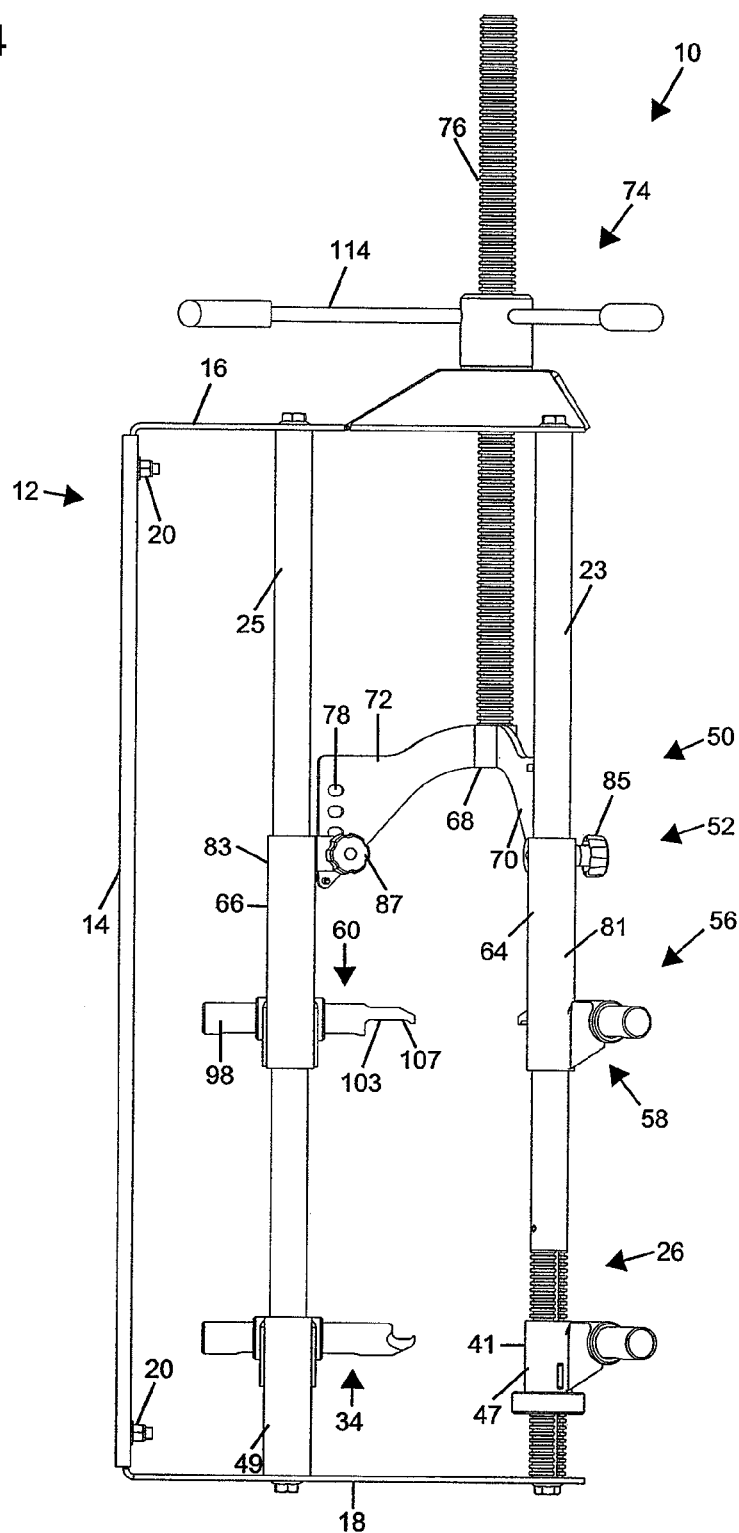
FIG. 4 is a side elevational view of the apparatus depicted in FIG. 1.

In the embodiment shown in FIGS. 3-5, the spider member 62 includes a central hub 68 and at least three arms 70, 71, and 72 radiating from the hub 68. The hub 68 is secured to urging structure 74, which is used to move the second compression section 50 toward and away from the first compression section 26. The urging structure 74 is discussed further below.

The central hub 68, in the embodiment shown, is cylindrical and is securely fastened to a threaded shaft 76, which is part of the urging structure 74. In the embodiment shown, there are three arms 70-72, with each arm 70-72 being integral with the hub 68. In the embodiment shown, the hub 68 is depicted generally centered within the posts 23, 24, and 25, with each of the arms 70-72 extending between the hub 68 and a respective one of the posts 23-25. In the specific embodiment illustrated, the arm 70 extends between the hub 68 and the post 23; the arm 71 extends between the hub 68 and the post 24; and the arm 72 extends between the hub 68 and the post 25.

Still in reference to FIGS. 3-5, each of the arms 70-72 defines a plurality of voids or holes 78. The holes 78 cooperate with the axial translators 64-66 to allow for the holders 58-60 to be independently axially adjustable relative to the frame 12. In the embodiment shown, each of the arms 70-72 defines four holes 78 to permit axial adjustment in a finite number of discrete positions; in the embodiment shown, four discrete positions. It should be appreciated that in other embodiments, there can be more or fewer holes 78, including one elongated slot that is otherwise axially lockable along an infinite number of positions within the elongated slot; or other means of infinite or finite adjustment. More details on how the holders 58-60 are axially adjustable relative to the frame 12 is discussed further below.

As mentioned above, the compression head 52 includes the at least three axial translators 64-66. Each of the axial translators 64-66 is axially adjustable relative to the frame; secured to one of the arms 70-72 of the spider member 62; and is secured to one of the holders 58-60. In the particular embodiment illustrated in FIGS. 3-5, each of the axial translators 64-66 includes a frame sleeve 81, 82, and 83 slidable over the frame 12. Specifically, the frame sleeve 81 is slidable over the post 23; the frame sleeve 82 is slidable over the post 24; and the frame sleeve 83 is slidable over the post 25. This slidable relationship between the frame sleeves 81-83 and the respective posts 23-25 allows the holders 58-60 to be axially adjustable relative to the frame 12. Specifically, each of the frame sleeves 81-83 is a hollow tubular member that is moveable over the posts 23-25.

Secured to each of the frame sleeves 81-83 is a fastener arrangement 85, 86, and 87 that cooperates with the holes 78 in the arms 70-72 to allow the axial translators 64-66 to be axially locked into position relative to their respective posts 23-25. As can be seen in the exploded view of FIG. 2, the fastener arrangement 85 (which is identical to the fastener arrangements 86 and 87) includes a tube 88 oriented perpendicular to the frame sleeve 81, a pin assembly 89 received by the tube 88, and a knob 90. The pin 89 is extendable through a selected hole 78 in the arm 70 in order to either lock the axial translator 64 into vertical position on the post 23 or to allow the axial translator 64 to be moved from one of the holes 78 to another of the holes 78. In addition to allowing the axial translators 64-66 to be adjusted axially relative to the frame 12, the fastener arrangements 85-87 secure the axial translators 64-66 to the spider member 62. A variety of implementations are available for fastener arrangements 85-87, the one shown is just one example.

In reference again to FIG. 1, each of the axial translators 64-66 further includes a holder sleeve 92, 93, and 94 each retaining a respective one of the three holders 58, 59, and 60. As mentioned above, in the embodiment depicted, each of the holders 58-60 includes a rod 96, 97, and 98 having a hook 101, 102 (FIG. 3), and 103 (FIG. 4). Each of the rods 96-98 is slidably held within a respective one of the holder sleeves 92-94. As such, each of the holders 58-60 is adjustable radially relative to the frame 12 by slidable movement of the rods 96-98 within the holder sleeves 92-94. In the embodiment shown, each of the holders 58-60 is constructed similar to the holders 34, although alternate embodiments are contemplated. Each of the holder sleeves 92-94 is secured to a respective one of the frame sleeves 81-83 in a perpendicular relationship. That is, a central longitudinal axis passing through each of the frame sleeves 81-83 is contained within a plane that is normal or perpendicular to a plane containing a central longitudinal axis to each of the holder sleeves 92-94. Thus, each of the holders 58-60 is adjustable radially relative to the support members 21 of the frame 12.

As mentioned above, in the example embodiment illustrated, each of the holders 58-60 is constructed similar to the holders 34. As such, the holders 58-60 include a cupped recess area 105 (FIG. 3), 106 (FIG. 3), and 107 (FIG. 4). The cupped recess areas 105-107 allow for the holders 58-60 to engage the spring 28 or another portion of the strut assembly 30.

Each of the holders 58-60 is rotationally adjustable within the holder sleeves 92-94. That is, each of the rods 96-98 can be rotated within the fixed position of its respective holder sleeve 92-94. Again, this helps to allow the apparatus 10 to accommodate a large variety of strut assemblies 30.

As mentioned above, urging structure 74 is constructed and arranged to move the second compression section 50 toward and away from the first compression section 26. It should be noted that the second compression section 50 and first compression section 26 could be axially moveable, at the same time, toward each other. In the embodiment shown, the urging structure 74 includes threaded shaft 76, which is journaled through an upper and lower hub 109, 110 (FIG. 2). The lower hub 110 is mounted by way of a bearing 112 under the top plate 16. Accordingly, upper and lower hubs 109, 110 are freely turnable by an operator engaging handles 114 and turning the hubs 109, 110. Turning of the handles 114 moves the threaded shaft 76 up or down, depending on the direction of turning. Threaded shaft 76 terminates and is connected to the spider member 62, specifically, the hub 68 of the spider member 62. The threaded shaft 76 is parallel to and centrally located within the posts 23, 24, and 25. Thus, rotation of the handles 114 moves the shaft 76 axially relative to the frame 12, which moves the spider member 62 axially, which moves the axial translators 64-68 relative to the frame 12, which moves the compression element arrangement 56 including the holders 58-60 axially relative to the frame 12.

It is envisioned that other types of urging structure may be used. For example, hydraulics or pneumatic actuators may be used to urge the second compression section 50 toward the first compression section 26.

Use of the apparatus 10 will now be described with respect to the strut assembly 30 depicted in FIG. 5. The strut assembly 30 can be a common MacPherson type of strut assembly, or it can include a coil-over-shock type of strut assembly, to be described below. The strut assembly 30 includes spring 28 and shock absorber 32. The shock absorber 32 has a body portion 122 and an extending piston rod 124. Mounted on the body portion 122 is a lower spring seat 126. The upper spring seat 54 is connected to a free end of the piston rod 124 by means of a nut or retaining ring 130. The strut assembly 30 is commercially available and is well known. The spring 28 is retained between the lower spring seat 126 and the upper spring seat 54 with the spring 28 held in compression.

From time to time, it is desirable to remove the shock absorber 32 from the strut assembly 30. The apparatus as described herein is suitable for performing this task. The strut assembly 30 is placed in the apparatus 10. The lower section of the strut assembly 30 is mounted within the first compression section 26. The mounts 41 and 42 are vertically adjusted along the posts 23, 24 in order to adjust the holders 34 such that their recessed areas 40 (FIG. 1) engage a portion of the strut assembly 30, such as the spring 28 and position the spring 28 vertically aligned with a central, longitudinal axis of the apparatus 10. An operator rotates the handles 114 in order to move the threaded shaft 76 downwardly and thus move the spider member 62, the axial translators 64-66, and the holders 58-60 downwardly toward the first compression section 26. The compression head 52 is moved downwardly until it is low enough to engage the strut assembly 30.

Apparatus 10 allows for servicing of at least four different types of strut assemblies, shown in FIGS. 5-8. In FIG. 5, a coil-over-shock type is shown. For that type of assembly, the holders 58-60 of the compression element arrangement 56 are placed directly on the highest coil of the spring 28. The piston rod 124 and upper spring seat 54 on this type of strut assembly is connected by nut or retaining ring 130.

Figure 6:
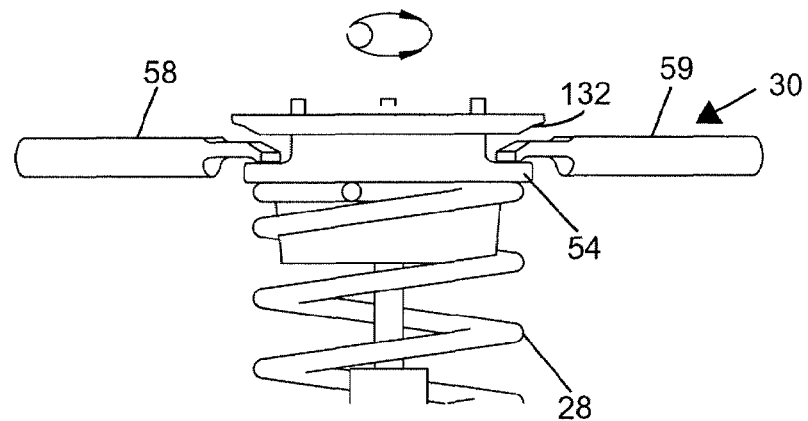
FIGS. 6-8 are partial front elevational views of the apparatus being used with various types of strut assemblies.

FIG. 6 shows a type of strut that has a rotatable bearing plate 132 and upper spring seat 54. For that type of assembly, the holders 58-60 are placed on the upper spring seat 54. (Only two of the holders 58-60 are visible in FIGS. 6-8.)

Figure 7:
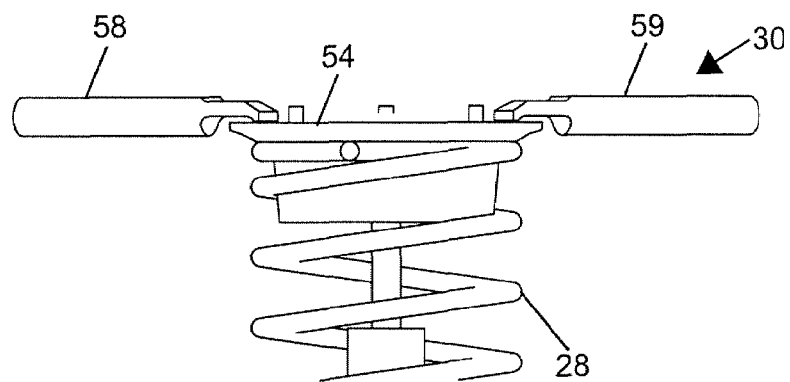

In FIG. 7, a strut assembly is shown that has only upper spring seat 54. The upper hooks 101-103 are placed on the upper spring seat 54.

Figure 8:
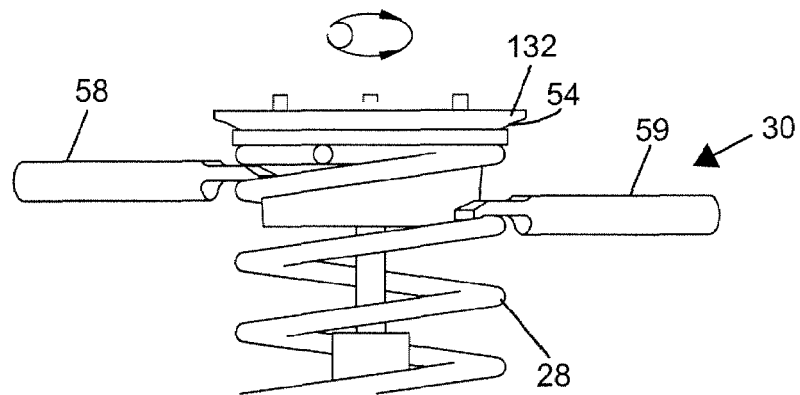

In FIG. 8, the strut assembly 30 has a rotatable bearing plate 132 and an upper spring seat 54 without space between the bearing plate 132 and the upper spring seat 54. For that type of assembly, the holders 58-60 are placed on the highest possible coil of the spring 28.

Once the strut assembly 30 is properly positioned in the first compression section 26 and second compression section 50, the operator may clip the bottom portion of the spring 28 to the lower spring seat 126. Any conventional clip can be used, and one example is illustrated in FIG. 2 at reference numeral 136. Next, the operator removes a nut (not shown) connecting the upper spring seat 54 to the piston rod 124. The clip 136 keeps the shock absorber 32 from falling out of the spring 28. If removal of the upper spring seat 54 or spring 28 is desired, the operator then turns the handle 114 in an opposite direction and relieves compression of the spring 28. With the compression fully relieved, the operator may remove the spring 28 and replace it or repair the shock absorber 32 as desired. To replace a spring 28 in compression, the apparatus 10 is used in the sequence opposite to that described above.

It will be apparent to those skilled in the art that various modifications and variations can be made to the apparatus 10 without deviating from the scope or spirit of principles of this disclosure. For example, the first and second compression sections 26, 50 could be reversed.

Other embodiments will be apparent to those skilled in the art. It is intended that the specification and examples are considered as examples only.

We claim:

1. An apparatus for use in assembling and disassembling a strut assembly having a shock absorber axially disposed within a coil spring; the apparatus comprising: a frame; a first section secured to the frame to support one portion of the strut assembly; a second section including a compression head secured to and axially adjustable relative to the frame; the second section including a compression element arrangement to impart a force on a second portion of the strut assembly and urge the spring to compress as the compression head is axially moved toward the first section; an urging structure to move the second section toward and away from the first section;

wherein the improvement comprises:
  (a) the compression element arrangement includes at least 3 holders; each of the at least 3 holders being independently axially adjustable relative to the frame;
  (b) the compression head includes a spider member having a hub and a plurality of arms;
    (i) the hub being secured to the urging structure;
  (c) the compression head includes at least 3 axial translators; each axial translator being:
    (i) independently axially adjustable relative to the frame;
    (ii) secured to one of the arms of the plurality of arms; and
    (iii) secured to one of the holders of the at least 3 holders; and
  (d) each of the axial translators includes a frame sleeve slidable over the frame.

2. An apparatus according to claim 1 wherein:
  (a) the frame includes at least 3 posts; each of the frame sleeves being slidably disposed around one of the 3 posts.

3. An apparatus according to claim 1 wherein:
  (a) each of the axial translators further includes a holder sleeve; each of the holder sleeves retaining one of the 3 holders.

4. An apparatus according to claim 3 wherein:
  (a) the frame includes at least 3 posts; each of the frame sleeves being slidably disposed around one of the 3 posts;
  (b) each of the axial translators is adjustable axially relative to one of the arms of the spider member; and
  (c) each of the holders includes a rod having a hook; each rod being radially adjustable relative to the frame and rotationally adjustable relative to the holder sleeve.

5. An apparatus for use in assembling and disassembling a strut assembly having a shock absorber axially disposed within a coil spring; the apparatus comprising: a frame; a first section secured to the frame to support one portion of the strut assembly; a second section including a compression head secured to and axially adjustable relative to the frame; the second section including a compression element arrangement to impart a force on a second portion of the strut assembly and urge the spring to compress as the compression head is axially moved toward the first section; an urging structure to move the second section toward and away from the first section;

wherein the improvement comprises:
  the compression element arrangement includes at least 3 holders; each of the at least 3 holders being independently axially adjustable relative to the frame; and
  each of the holders includes a rod having a hook; each rod being radially adjustable relative to the frame.

6. An apparatus for use in assembling and disassembling a strut assembly having a shock absorber axially disposed within a coil spring; the apparatus comprising: a frame; a first section secured to the frame to support one portion of the strut assembly; a second section including a compression head secured to and axially adjustable relative to the frame; the second section including a compression element arrangement to impart a force on a second portion of the strut assembly and urge the spring to compress as the compression head is axially moved toward the first section; an urging structure to move the second section toward and away from the first section;

wherein the improvement comprises:

(a) the compression element arrangement includes at least 3 holders; each of the at least 3 holders being independently axially adjustable relative to the frame;

(b) the frame includes a top plate;

(c) the urging structure includes:

(i) a threaded shaft extending through the top plate;

(ii) first and second hubs on opposite sides of the top plate; the second hub being mounted by way of a bearing to allow the first and second hubs to be turnable; the shaft extending through the first and second hubs and the bearing; and (iii) a handle secured to the first hub; the handle being rotatable relative to the shaft to axially move the shaft relative to the frame;

(d) the frame further includes a bottom plate and at least 3 posts connecting the top plate and the bottom plate;

(e) the compression head includes a spider member having a hub and a plurality of arms;

(i) the hub being secured to the threaded shaft and axially moves with the threaded shaft; and (f) the compression head includes at least 3 axial translators; each axial translator:

(i) having a frame sleeve axially slidable over one of the 3 posts of the frame;

(ii) being secured to and axially adjustable relative to one of the arms of the plurality of arms; and (iii) having a holder sleeve retaining one of the holders of the at least 3 holders.

* * * * *

UNITED STATES PATENT AND TRADEMARK OFFICE
CERTIFICATE OF CORRECTION

PATENT NO. : 7,386,926 B2  Page 1 of 1
APPLICATION NO. : 11/387990
DATED : June 17, 2008
INVENTOR(S) : Bosche et al.

It is certified that error appears in the above-identified patent and that said Letters Patent is hereby corrected as shown below:

On the Title Page Item (56) References Cited, Foreign Patent Documents: insert --CA   707643   04/1965-- in appropriate order Signed and Sealed this Sixteenth Day of December, 2008

JON W. DUDAS
*Director of the United States Patent and Trademark Office*